US011138753B2

(12) United States Patent
Barth et al.

(10) Patent No.: US 11,138,753 B2
(45) Date of Patent: Oct. 5, 2021

(54) METHOD AND DEVICE FOR LOCALIZING A SENSOR IN A VEHICLE

(71) Applicant: APTIV TECHNOLOGIES LIMITED, St. Michael (BB)

(72) Inventors: Alexander Barth, Wermelskirchen (DE); David Schiebener, Mettmann (DE); Andrew J. Lasley, Noblesville, IN (US); Detlef Wilke, Sibbesse (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/816,705

(22) Filed: Mar. 12, 2020

(65) Prior Publication Data

US 2020/0320730 A1 Oct. 8, 2020

(30) Foreign Application Priority Data

Apr. 4, 2019 (EP) ..................................... 19167433

(51) Int. Cl.
*H04N 13/00* (2018.01)
*G06T 7/70* (2017.01)
(Continued)

(52) U.S. Cl.
CPC ............... *G06T 7/70* (2017.01); *B60R 11/04* (2013.01); *H04N 5/2253* (2013.01);
(Continued)

(58) Field of Classification Search
CPC ............... B60R 11/04; B60R 2011/001; B60R 2011/0015; B60R 2011/0017;
(Continued)

(56) References Cited

U.S. PATENT DOCUMENTS 5,724,743 A 3/1998 Jackson
7,019,623 B2 3/2006 Klausner et al.
(Continued)

FOREIGN PATENT DOCUMENTS

CN 1283265 A 2/2001
CN 1283266 A 2/2001
(Continued)

OTHER PUBLICATIONS

Extended European Search Report for Application No. EP 19 16 7433 dated Sep. 26, 2019.
(Continued)

*Primary Examiner* — Gims S Philippe
(74) *Attorney, Agent, or Firm* — Carlson, Gaskey & Olds

(57) ABSTRACT

A method for localizing a sensor in a vehicle includes using a first sensor mounted on a vehicle to capture at least one image of a moveable element of the vehicle, the moveable element having a predetermined spatial relationship to a second sensor mounted on the vehicle, the moveable element being moveable relative to the first sensor; determining spatial information on the moveable element on the basis of the at least one image; and localizing the second sensor on the basis of the spatial information by a transformation rule representing the predetermined spatial relationship between the moveable element and the second sensor.

16 Claims, 3 Drawing Sheets

(51) Int. Cl.
*H04N 13/106* (2018.01)
*B60R 11/04* (2006.01)
*H04N 5/225* (2006.01)
*H04N 5/247* (2006.01)
*B60R 11/00* (2006.01)

(52) U.S. Cl.
CPC .......... *H04N 5/247* (2013.01); *H04N 13/106* (2018.05); *B60R 2011/001* (2013.01); *B60R 2011/0015* (2013.01); *B60R 2011/0017* (2013.01); *B60R 2011/0022* (2013.01); *B60R 2011/0028* (2013.01); *G06T 2207/10028* (2013.01); *G06T 2207/20084* (2013.01); *G06T 2207/30244* (2013.01); *G06T 2207/30268* (2013.01); *H04N 2013/0081* (2013.01)

(58) Field of Classification Search
CPC .... B60R 2011/0022; B60R 2011/0028; G06K 9/00832; G06T 2207/10028; G06T 2207/20084; G06T 2207/30244; G06T 2207/30268; G06T 7/70; H04N 13/106; H04N 2013/0081; H04N 5/2253; H04N 5/24
USPC ........................................................... 348/42
See application file for complete search history.

(56) References Cited

U.S. PATENT DOCUMENTS

| | | | |
|---|---|---|---|
| 2002/0049530 A1* | 4/2002 | Poropat | G01S 5/16 701/23 |
| 2005/0077469 A1 | 4/2005 | Kaushal | |
| 2007/0135982 A1* | 6/2007 | Breed | B60N 2/2863 701/36 |
| 2011/0133919 A1 | 6/2011 | Evarts et al. | |
| 2012/0283894 A1 | 11/2012 | Naboulsi | |
| 2015/0049199 A1 | 2/2015 | Rogers et al. | |
| 2015/0084764 A1 | 3/2015 | Wunsche | |
| 2015/0210237 A1 | 7/2015 | Peterson et al. | |
| 2016/0217577 A1* | 7/2016 | Tom | G06K 9/52 |
| 2016/0251030 A1 | 9/2016 | Okada et al. | |
| 2017/0301111 A1* | 10/2017 | Zhao | G01C 25/005 |
| 2018/0061055 A1 | 3/2018 | Owechko | |
| 2018/0188039 A1* | 7/2018 | Chen | G01C 21/32 |
| 2019/0120947 A1* | 4/2019 | Wheeler | G01S 17/42 |
| 2020/0142410 A1* | 5/2020 | Liu | B64C 39/024 |
| 2020/0202198 A1* | 6/2020 | Lee | G06N 3/0454 |

FOREIGN PATENT DOCUMENTS

| | | |
|---|---|---|
| CN | 1826508 A | 8/2006 |
| CN | 1914481 A | 2/2007 |
| CN | 101331384 A | 12/2008 |
| CN | 101351683 A | 1/2009 |
| CN | 105209853 A | 12/2015 |
| CN | 105492985 A | 4/2016 |
| CN | 107567412 A | 1/2018 |
| CN | 107850901 A | 3/2018 |
| CN | 107924194 A | 4/2018 |
| CN | 108779984 A | 11/2018 |
| CN | 109212543 A | 1/2019 |
| EP | 2017774 A2 | 1/2009 |
| EP | 3040254 A1 | 7/2016 |
| GB | 2506685 A | 10/2012 |
| WO | 2018/059628 A1 | 4/2018 |

OTHER PUBLICATIONS

Xia, et al., Combination of ACF Detector and Multi-task CNN for Hand Detection, Department of Computer Science and Software Engineering, Xi'an Jiaotong-Liverpool University, Suzhou, China, 215123, pp. 601-606, ICSP2016.

Zhou, et al., Hierarchial Context-Aware Hand Detection Algorithm for Naturalistic Driving, Intelligent Computing Division, Toyota InfoTechnology Center USA, Mountain View, California, USA, 6 pages.

Borghi, et al., Hands on the wheel: a Dataset for Driver Hand Detection and Tracking, DIEF—Department of Engineering "Enzo Ferrari", University of Modena and reggio Emilia, Modena, Italy, eight pages, 2018 IEEE.

Amortila, et al., Positioning study of driver's hands in certain areas of the steering wheel, MATEC Web of Conferences 178, 06014 (2018), six pages, IManE&E 2018, https://doi.org/10.1051/matecconf/201817806014.

Rangesh, et al., Driver Hand Localization and Grasp Analysis; A Vision-based Real-time Approach, 2016 IEEE 19th International Conference on Intelligent Transportation Systems, Publication date: Nov. 1, 2016, six pages.

Le, et al., Robust Hand Detection and Classification in Vehicles and in the Wild, eight pages.

Le, et al., Robust Hand Detection in Vehicles, 2016 23rd International Conference on Pattern Recognition (ICPR), Cancun Center, Cancun, Mexico, Dec. 4-8, 2016, six pages.

Le, et al., Multiple Scale Faster-RCNN Approach to Driver's Cell-phone Usage and Hands on Steering Wheel Detection, IEEE Computer Society Conference on Computer Vision and Pattern Recognition Workshops, pp. 46-53, 2016.

Tran, et al., Driver Assistance for "Keeping Hands on the Wheel and Eyes on the Road," Laboratory for Intelligent and Safe Automobiles (LISA), University of California at San Diego, La Jolla, CA, USA, Dec. 2009, five pages.

Cucchiara, et al., Camera-Car Video Analysis for Steering Wheel's Tracking, Departimento di Ingegneria dell'Informazione, Universita di Modena e Reggio Emilia, Italy; Department of Computer Systems, Faculty of IT, University of Technology, Sydney, Australia, pp. 36-43.

Office Action for Chinese Application No. 20201061041.4 dated Jun. 29, 2021.

* cited by examiner

METHOD AND DEVICE FOR LOCALIZING A SENSOR IN A VEHICLE

CROSS REFERENCE TO RELATED APPLICATION

This application claims priority to European Patent Application No. EP 19167433.2, filed on Apr. 4, 2019.

FIELD

The invention relates to a method and a device for localizing a sensor in a vehicle by using another sensor.

BACKGROUND

Technology advances of recent driver assistance systems lead to an increased degree of automation in vehicles for the mass market. The human driver can hand over the control of the vehicle to a "steering computer" or the like in certain circumstances and scenarios. Today the driver is still fully responsible for the driving task. Even with higher levels of automation, the human driver will remain responsible for monitoring the vehicle and, if required, has to be able to regain the control in a reasonable amount of time.

Camera-based driver-monitoring systems have been developed to monitor the driver's eyes and head pose to derive information about the awareness or drowsiness of the driver. Other applications of such camera systems include the computation of eye gaze, i.e. where the driver is looking at. Such information is not only relevant for safety, but also for comfort features, such as selecting content on an infotainment system just by looking at things. Such camera-based systems require a camera or another sensor to be mounted on the vehicle.

A common mounting position of such a camera or other sensor is on the steering wheel column. This position offers a good view on the driver's face and eyes. However, as the steering wheel position and/or the steering wheel column can be adjusted to fit different driver sizes and preferences, the camera can be moveable together with the steering wheel column. For example, the steering wheel and the steering wheel column can be adjusted electronically or mechanically in forward/backward and/or upward/downward directions.

For various applications the relative and/or absolute position of the camera and/or its orientation within the car are required in order to map objects from a camera coordinate system to a vehicle coordinate system. One example is the accurate localization of the driver's head position with respect to the vehicle coordinate system, e.g. in the context of eye gaze. In other words, the location of the camera needs to be known in order to reliably derive spatial, i.e. positional data from the images which are captured by means of the camera. If the camera location is not known the spatial data can only be determined relative to the camera, but not in relation to other coordinate systems or elements. For example, the viewing direction of a person cannot be precisely matched with elements inside or outside the car without having reliable information about the sensor position and/or orientation.

In light of the foregoing it is desired to provide a method for localizing the camera. In particular, the camera may be localized with respect to a target coordinate system which is independent from the coordinate system of the camera. The target coordinate system can be, for example, a vehicle coordinate system. When the location of the camera is known spatial data can be precisely determined on the basis of images captured by the camera, for example the eye gaze and the position and/or orientation of the driver's head.

Some vehicles allow for an electronic adjustment of the steering wheel, while others have a purely mechanical mechanism to change the angle and distance of the steering wheel. While in the first approach it is theoretically possible to monitor the electronic adjustments and translate them into a change of the camera position from a reference position, in practice such information is not available in many cars (e.g. on the CAN bus). For example, one might only obtain the information that the steering wheel has been adjusted, however, not by how much. In the purely mechanical version, there is no such information at all.

A solution is needed for reliably localizing a sensor mounted on a vehicle.

SUMMARY

In one aspect, a method for localizing a sensor in a vehicle is provided. The method includes at least the following steps: capturing, by means of a first sensor being mounted on a vehicle, at least one image of a moveable element of the vehicle, the moveable element having a predetermined spatial relationship to a second sensor being mounted on the vehicle, the moveable element being moveable relative to the first sensor; determining flail spatial information on the moveable element on the basis of the at least one image; and localizing the second sensor on the basis of the spatial information by means of a transformation rule, the transformation rule representing the predetermined spatial relationship between the moveable element and the second sensor.

Localizing of the second sensor can generally comprise two steps.

In a first step, spatial information on the moveable element is determined based on image data. The spatial information can be, e.g., a position and/or orientation of the moveable element with respect to a coordinate system of the vehicle. The spatial information may thus be denoted as absolute spatial information. Since the spatial information is determined on the basis of an image captured by the first sensor, the spatial information may be transformed from the coordinate system of the first sensor to a coordinate system of the vehicle by using a predetermined second transformation rule. However, it can also be provided that the spatial information is directly determined, i.e. without transforming the data from a sensor coordinate system of the first sensor to the vehicle coordinate system. Algorithms for determining spatial information from images are generally known from the art, for example from neural network technology. Specific embodiments will be explained in more detail further below.

In a second step, the location of the second sensor is determined on the basis of the spatial information by means of said (first) transformation rule. This transformation rule describes the spatial relationship between the moveable element and the second sensor. This spatial relationship is preferably fixed, i.e. the moveable element and the second sensor can only be moved together without changing the position and orientation between the element and the sensor. Therefore, the transformation rule can also be fixed, for example in form of a transformation matrix having fixed values. However, as the case may be, the spatial relationship can be variable so that the transformation rule can have various forms. Nevertheless, the spatial relationship is predetermined, i.e. known a-priori. The transformation rule or parameters thereof can thus be stored before carrying out the method.

One aspect of the method is its high flexibility. It can be applied to virtually any configuration inside a vehicle and a physical measurement of the spatial information, e.g., by acceleration sensors is not required. Therefore, the method can easily be adapted to different types of vehicles. As another advantage the first sensor can also be used for other purposes, for example for monitoring portions of the vehicle other than the moveable element. The hardware required for carrying out the method can thus be used in a synergistic way.

According to a further aspect, the method includes matching a geometrical model of the moveable element to the at least one image by using a matching algorithm, wherein the spatial information is determined on the basis of the matched model, i.e. the model being matched to the moveable element by means of the matching algorithm. The matching can be a fitting of a predetermined geometrical model comprising an iterative evaluation of a cost function or other rating function that represents the accordance between the model and the true moveable element captured in the image. The matching can comprise positioning of the geometrical model at a plurality of sample positions and/or orientations, wherein the cost function is computed for each of the sample positions and/or orientations. A maximum of the cost function can then be used to identify the matched model.

The geometrical model generally represents the moveable element. For example, the model or the outer shape of the model can be represented by a mathematical function, which is a very compact representation and therefore associated with a number of advantages. The model can also be represented by a limited number of points in order to reduce the complexity of the method.

Said matching algorithm preferably comprises or is configured as a particle algorithm, a grid-search algorithm and/or a regression algorithm. These types of algorithms are generally known from the art.

The matching step can comprise the following: generating a plurality of sample points for the geometrical model, each of the sample points having a spatial position; determining, for at least some of the sample points, a plurality of sample pixels of the at least one image, each of the sample pixels having a respective pixel value of the at least one image; computing a rating function on the basis of the sample pixels, i.e. their pixel values; determining the matched model on the basis of the rating function. It is understood that the at least one image comprises a plurality of pixels, each of the pixels having a respective pixel value. The sample pixels are a subset of the totality of pixels that form the at least one image.

In one example the moveable element is formed by a steering wheel. Said model of the moveable element can then be, e.g., a torus, in particular an elliptical torus. To estimate the spatial information, e.g. 3D position and orientation (pose), possible locations can be sampled by using a regular-grid search and/or a particle-filter like approach. For each possible sample location, the rating function can be calculated based on a specific portion of pixel values of the at least one image, these pixels can be selected on the basis of the generated sample points, as indicated further above. The rating function can generally represent the match between the model at the respective sample location and the image.

Having further regard to said generated sample points for identifying the sample pixel values, a first group of the sample points can be located on the geometrical model, and a second group of the sample points can be located outside the geometrical model, wherein difference pixel values can be computed between sample points of the first and second group. This can be done by subtracting pixel values of the sample pixels being associated with the sample points. In particular, each difference pixel value can be formed by subtracting a pixel value from the first group from a pixel value of the second group, wherein both pixel values are associated with a pair of sample pixels positioned on a line that extends in a radial direction or transversely with respect to the model. The rating function can be computed on the basis of the difference pixel values, which allows determining the spatial information with high accuracy.

In one example the values of the first group can be depth (i.e. distance) values of sample points located centrally on the model. In addition or alternatively, depth values of image points located on the outer edge of the model can be used. The values of the second group can be the depth values of the sample points located outside the model. The values of some points of the first group, for example the points located on the edges, can be gradients of the depth values, wherein these gradients result from processing the depth values by an edge detection filter, e.g. a Sobel edge filter. Exemplary algorithmic details are described further below.

According to another aspect, the method further comprises processing of the at least one image or a portion thereof by means of a neural network for obtaining an output, wherein the spatial information is determined on the basis of the output. The neural network is preferably formed by a convolutional neural network. The use of a neural network can be an alternative to the use of a matching algorithm. However, a combination is also possible, wherein the spatial information can be determined on the basis of the output of the neural network and the matched model, for example by fusing the two results. It is also possible that the output of the neural network is used as a prior (i.e. prior probability distribution) for the matching algorithm, e.g. for example by constraining the search space of a particle algorithm. As an alternative the spatial information from the particle algorithm can be used to roughly localize the moveable element, wherein the roughly determined location is then used for determining an image portion of the moveable element by cropping the image to the moveable element including a margin. The image portion can then be processed by the neural network for obtaining the output.

According to another aspect, the at least one image comprises three-dimensional (3D) image data. The first sensor can thus comprise a time-of-flight camera, an ultrasonic sensor, a radar sensor, a structured light camera and/or a Lidar sensor. Other sensors for acquiring three-dimensional image data can also be used, in particular multiple sensors, e.g. a stereoscopic sensor pair.

The spatial information on the moveable element can comprise a position and/or an orientation, e.g. an angle of the moveable element. The spatial information can be provided with respect to a predetermined coordinate system, in particular a coordinate system of the vehicle.

According to another aspect, the moveable element comprises at least a portion of one of the following: a steering element of the vehicle, a housing of the second sensor, a steering element column of the vehicle, a headrest of a vehicle seat. The steering element can be a steering wheel or the like.

According to yet another aspect, the first sensor is mounted on one of the following portions of the vehicle: an inner side of a roof, a pillar of a vehicle body (e.g., A or B pillar), a headrest of a seat (e.g., the seat of the driver), a seat backrest.

In general, the moveable element can be moveable relative to the first sensor essentially only due to an adjustment of the driver or another person. This adjustment can be carried out manually or electronically.

In one embodiment, the second sensor is mounted on a steering wheel column of the vehicle, wherein the steering wheel column is moveable relative to the first sensor and comprising the moveable element. In addition the second sensor can be configured to take images of a vehicle seat in which a passenger's body or a portion thereof is expected to be located when the passenger is sitting on the vehicle seat.

The moveable element can comprise a reflective surface. In this way, the spatial information can be determined with an increased reliability. The reflective properties of the surface can be adapted to the first sensor. This is to say that the first sensor can be configured to detect the reflective properties, thereby improving the detection of the moveable element. The reflective properties can be adapted to increase the ratio of pixel values from pixels located on the reflective surface relative to pixel values from pixels located outside the reflective surface. This can be interpreted as a way to improve the signal-to-noise ratio.

The reflective properties of the reflective surface can be limited to a range of wavelengths, wherein the range is adapted to the sensitivity of the first sensor. In one example, radiation having a wavelength within said range can essentially be invisible to human eyes. For example, the range of wavelengths can be defined in accordance to the wavelengths of infrared radiation.

According to another aspect, a device for localizing a sensor in a vehicle is provided. The device comprises an input for receiving at least one image captured by a first sensor and a processing unit (comprising, e.g. a processor and a memory). The processing unit is configured to determine a location of a second sensor by carrying out at least one of the methods disclosed herein. The processing unit can be further configured to process images captured by the second sensor with respect to the location of the second sensor. The location of the second sensor can thus be used for calibrating the operation of the second sensor. In this way, absolute spatial information can be derived from the images of the second sensor because the second sensor knows its location with respect to the "absolute" coordinate system, which can be a vehicle coordinate system. As an alternative, the processing unit can have an output for outputting the location of the second sensor to another processing unit, which is connected to the second sensor and configured to process images captured by the second sensor with respect to the location of the second sensor. One or both of said processing units may comprise at least one memory unit and at least one non-transitory data storage. The non-transitory data storage and/or the memory unit may comprise a computer program for instructing the computer to perform several or all steps or aspects of the computer implemented method described herein.

According to another aspect, a non-transitory computer readable medium is provided. It comprises instructions, which when executed by a processing unit (in particular one of said processing units), cause the processing unit to carry out the method as described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

A system comprises the device as described above, a first sensor and a second sensor, and at least the first sensor is connected to the device. If the processing unit of the device is configured to output the location of the second sensor to another processing unit then the second sensor is preferably connected to the other processing unit. If only one processing unit is used which is configured to determine the location and to process the images of the second sensor then the second sensor is preferably connected to this processing unit.

It is understood that features described in connection with the method can be realized in the device as well as the system and vice versa.

BRIEF DESCRIPTION OF THE DRAWINGS

Exemplary embodiments and functions of the present disclosure will be described in more detail in the following with reference to the drawings which show in.

In the figures, the same or corresponding parts are indicated with the same reference signs.

DETAILED DESCRIPTION

Figure 1:
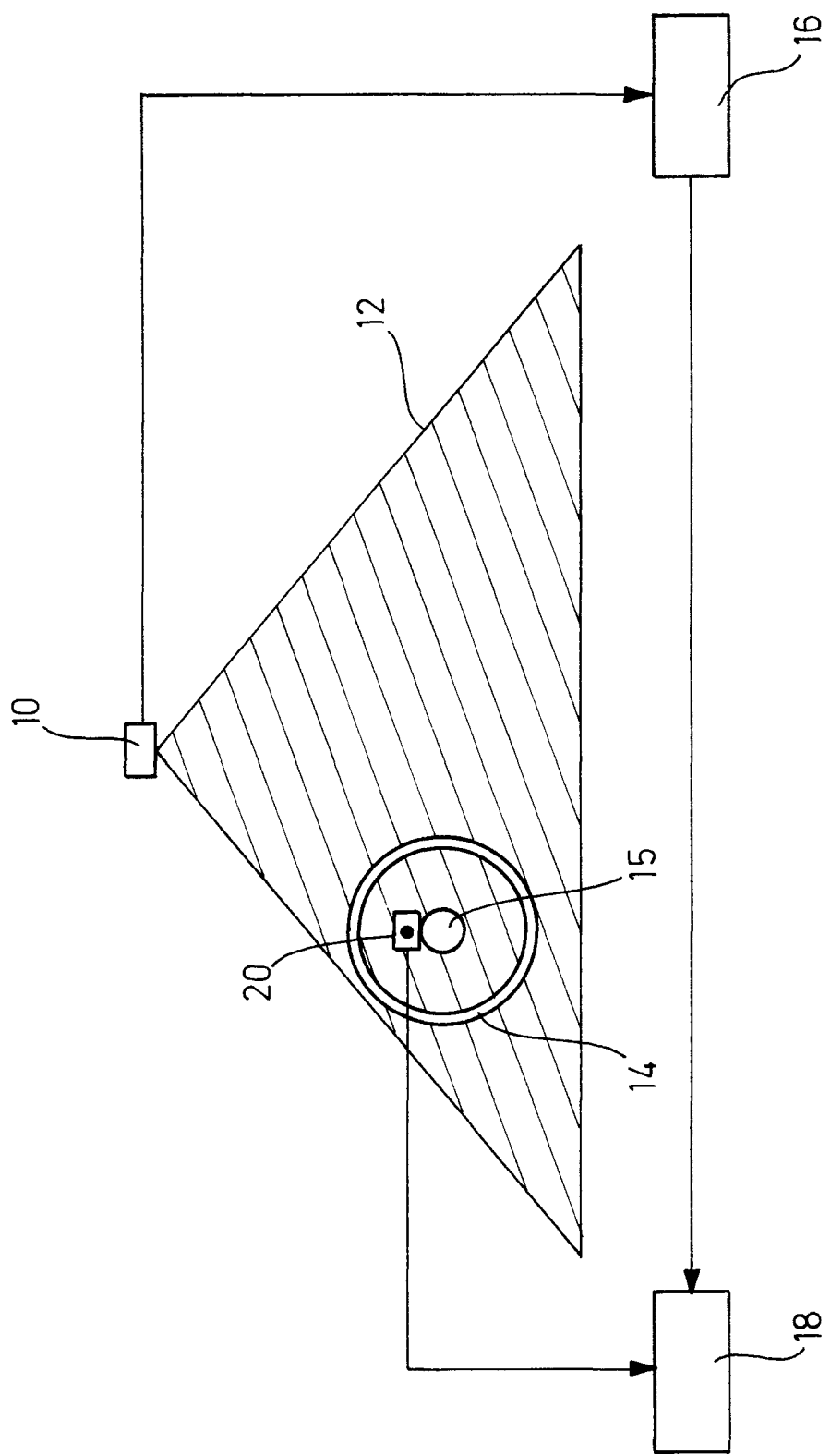
FIG. 1 a schematic illustration of a system for localizing a sensor in a vehicle.

FIG. 1 illustrates aspects of a system for carrying out a method for localizing a second sensor 20 by using a first sensor 10. The first sensor 10 is mounted on a vehicle (not shown) such that a field of view 12 of the sensor 10 captures a steering wheel 14 of the vehicle. The sensor 10 can be mounted inside a passenger cabin of the vehicle (not shown), for example at the inside of a roof of the cabin. The sensor 10 can be a camera for capturing images of the field of view 12, wherein the camera can be configured to provide three-dimensional images, for example when the camera is a time-of-flight camera.

The second sensor 20 is mounted on a steering wheel column 15 of the vehicle at a predetermined position. The steering wheel column 15 can be adjusted to various positions, wherein the second sensor 20 is usually only moveable together with the steering wheel column 15.

The spatial relationship between the steering wheel 14 and the second sensor 20 is preferably fixed, i.e. the steering wheel 14 is only moveable together with the steering wheel column 15. The steering wheel 14 does not necessarily need to be mechanically connected to a portion of the steering wheel column 15 on which the second sensor 20 is mounted. For example the second sensor 20 can be mounted on a housing of the steering wheel column 15. However, the spatial relationship between the steering wheel 14 and the second sensor 20 is at least predetermined, i.e. known a-priori. Therefore, the steering wheel 14 can also be moveable relative to the second sensor 20 if the spatial relationship remains to be known.

It is preferred that adjustments of the steering wheel column 15 do not lead a displacement of the steering wheel 14 beyond the field of view 12. Therefore, each of the images captured by the first sensor 10 includes the steering wheel 14, at least partially. Preferably, the first sensor 10 is arranged such that the steering wheel 14 is always contained in the images captured by the first sensor 10.

The first sensor 10 is connected to a processing unit 16, which is configured to carry out a computer-implemented method for localizing a second sensor 20 by means of the first sensor 10. This will be described in greater detail in the following.

The method begins with capturing at least one image (not shown) by means of the first sensor 10. The image is then processed by means of the processing unit 16 for determining the location, e.g. position and/or orientation of the second sensor 20.

In one aspect of the method the steering wheel 14 is detected within the image by localizing the steering wheel 14 within the image. This can be done by using a particle-filter algorithm. In particular, the 3D position and orientation of the steering wheel 14 can be determined based on amplitude (intensity) and/or depth data of the image, wherein the first sensor 10 can be a time-of-flight camera mounted inside the vehicle, as indicated further above. This is to say that the image comprises three-dimensional image data. Alternatively, 2D-image data can be used.

As an initial step for localizing the steering wheel 14 a fixed number of samples for the position and orientation of the steering wheel 14 are drawn uniformly (or according to normal distributions centered at the last known position(s) of the steering wheel 14 or at the center of the range of possible positions of the steering wheel 14) at random within a predefined search space. In a first iteration, a rating function is calculated for each of the samples, wherein the rating function quantifies the accordance, i.e. match of the sample with the depth values of the image. This can be done by generating sample points for a model, namely an elliptical torus model 50 of the steering wheel 14 (cf. FIG. 2), the torus model 50 being positioned according to the sample. Corresponding sample pixels of the image are then identified and the rating function is computed on the basis of the pixel values of the sample pixels. More details of this step will be addressed further below.

For the next iteration, new samples are drawn from the samples of the first iteration with a probability that is proportional to the values of the rating function of the samples from the first iteration. Each or at least some of the new samples is slightly modified by adding small random values to its position and orientation. These random values are chosen from a Gaussian distribution with a standard deviation that is individually set for each dimension of the position and orientation in proportion to the size of the search space in that dimension. It is preferably enforced that the new samples stay within the search space.

For each of the redrawn samples of the next iteration the rating function is calculated again based on the depth values of the image. This process is repeated iteratively in the same manner, and with each iteration the standard deviations of the added random values are slightly reduced until they are at a tenth of their start value (simulated annealing). This effectively causes the samples to concentrate around those positions and orientations where the torus model 50 appears to fit well to the image. To increase the focus on the best result, one percent of the new samples is not drawn at random but created from the best result of the last iteration. Here, the random values that are added only have a hundredth of the usual standard deviation. Additionally (or alternatively), samples can be set to fixed values that cover the complete search space in regular intervals or uniformly at random.

The steering wheel position can usually be modified by the driver. Therefore, there is a range or number of possible positions and orientations of the steering wheel 14 relative to the first sensor 10. Knowledge about this range can be taken into account to constrain the search space further.

Details of the torus model 50 and the rating function are further described in the following.

The depth values of the image (the depth values form a depth image) are clamped to a predetermined range and then filtered over time to reduce noise. The filtering can be carried out on the basis of a sequence of images captured at subsequent time instances. A Sobel-edge filter is applied to the filtered image. The resulting edge image is clamped to reduce the effect of outliers and to avoid overrating of very steep edges compared to moderate ones. The rating function for the sampled steering wheel positions and orientations is calculated using the depth image, the edge image, and a model of the steering wheel 14.

Figure 2:
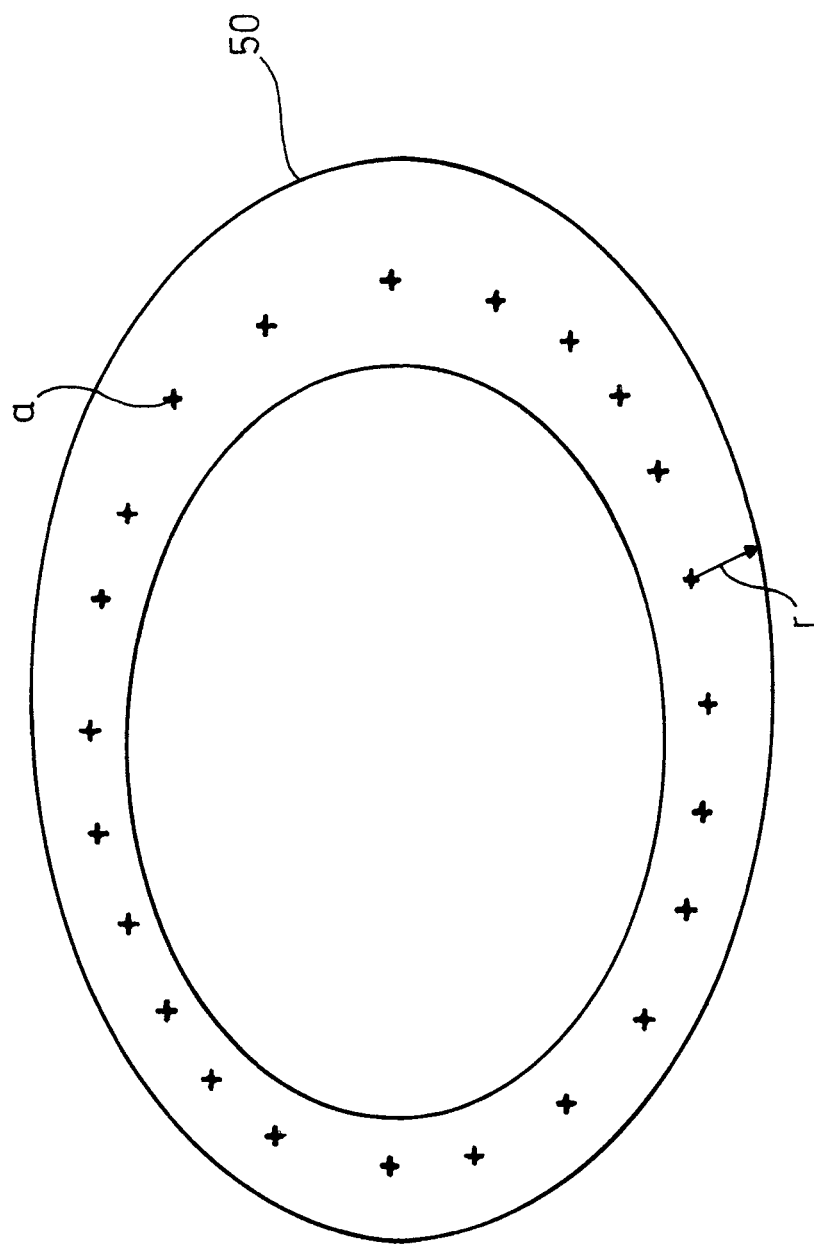
FIG. 2 a schematic illustration of a model representing a steering element in an image.

As also indicated further above the model is preferably an elliptical torus 50, FIG. 2, i.e. a surface consisting of all the points that have a certain distance r to an ellipse in 3D space. The length of the major and minor axis of the ellipse and the radius r are fixed and set to values that approximate the shape of the outer ring of the actual steering wheel 14 as seen by the first sensor 10 (which is known a priori). It is understood that the torus 50 is a three-dimensional geometrical model positioned in a three-dimensional space although FIG. 2 shows the torus 50 only in two dimensions.

For a given sample (position and orientation) of the model 50 a plurality of points (i.e. sample points) are determined for the purpose of evaluating the rating function for the respective sample. Each of the points is associated with a depth value. Due to the position and orientation of the model 50 the model 50 has a shape that depends on the perspective of the sensor 10. An example of such a shape is illustrated by the torus 50 of FIG. 2.

Figure 3:
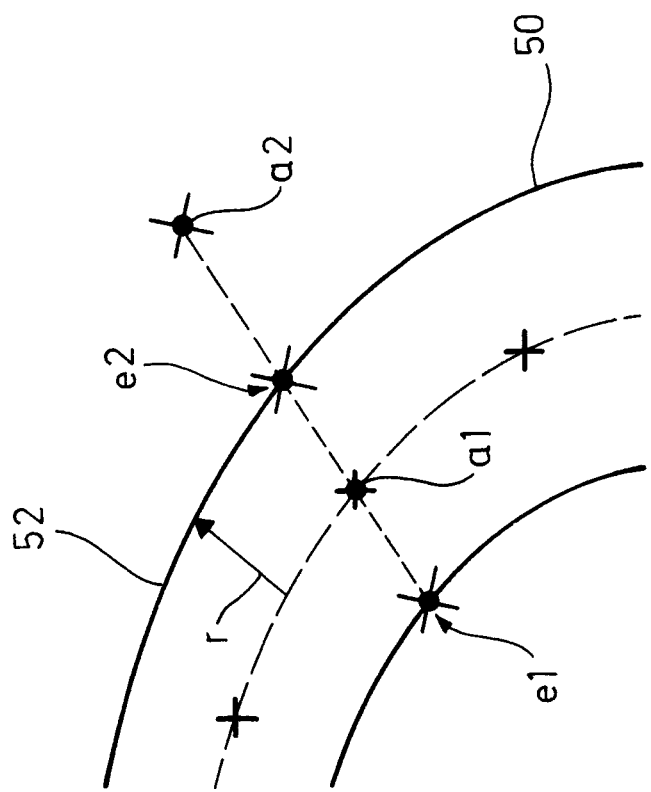
FIG. 3 a schematic illustration of a portion of the model of FIG. 2.

A fixed number of points a are sampled from the 3D ellipse spanning the torus 50 (cf. FIG. 2). For each or at least some of these points a, the local direction of the ellipse is approximated by subtracting its direct neighbours. For a given sample point a1 of the points a, cf. FIG. 3 showing a portion of the torus 50 of FIG. 2, two points e1 and e2 are determined that lie on the edge 52 of the torus 50 as seen from the point of view of the sensor 10. The direction from a1 to the edge 52 is given by the cross product of the local direction of the ellipsis with the direction from the sensor 10 position to a1. By moving along that direction, starting at a1, over a distance of the torus radius r into both directions, the two edge points e1 and e2 are obtained. Following that direction further than r into the direction that leads away from the center of the ellipse, a point a2 outside the torus is calculated.

For a given sample position and orientation for the torus 50 the 3D positions of the said sample points a, are calculated, and with them their respective edge points e1, e2 and points a2 outside the torus 50, as shown in an exemplary manner in FIG. 3 for the point a1. All or at least some of the points are then projected from 3D coordinates to pixel coordinates of the depth image using a predetermined transformation rule. The transformation rule can be based on intrinsic parameters of the sensor 10, i.e. prior knowledge about the spatial relationship between 3D points in the field of view of the sensor 10 and the resulting pixel information of the image can be available.

Using the depth image, for each point on the model 50 (i.e. points a, a1) and its corresponding points outside the model 50 (a2), their depth values are subtracted, i.e. a2−a1. The resulting depth differences can be clamped to a pre-defined range of values, e.g. a range between zero and a fixed value, in order to prevent an overly strong influence of implausible depth differences. This is because it can be assumed that the steering wheel 14 is closer to the sensor 10 than the background around the steering wheel 14 except possibly hands and arms of the driver.

The rating function can have two components, (i) the sum of the depth differences for all sample points (i.e. a2−a1 for all a) and (ii) the sum of the edge values of the edge image for all sample positions (i.e. e1+e2 for all a). Both components can then be added with weights. The result can be normalized and subjected to the exponential function so as to obtain the final result of the rating function for the respective sample location (i.e., the sample position and orientation of the model 50).

For at least some of the possible sample locations of the model 50 the rating function is computed as set forth above. The different results of the rating function are then compared in order to localize the steering wheel 14. For example, the maximum of the different results can be chosen and the respective position and orientation of the model 50 is the location of the steering wheel 14. Alternatively, a weighted or unweighted average of the different results or a subset of thereof with a high rating (above a threshold) can be determined and used to determine the position and orientation of the model 50 matching with the steering wheel 14. It is understood that the rating function can also be formulated in a way that the minimum of the different results of the rating function indicates the location of the steering wheel 14.

It is understood that instead of the steering wheel 14 a housing of the steering wheel column 15, a horn plate of the steering wheel 14, an airbag plate, and/or a housing of the second sensor 20 can be used the same way, wherein the shape of the model 50 can be adapted to the outer shape of said elements accordingly. This is to say that the shape of said elements can be reduced to a basic geometrical model and then be applied to the same algorithm.

The steering wheel 14 or another moveable element to be localized can be provided with a reflective coating in order to increase the signal-to-noise ratio of the image with respect to the element. For example a circle can be provided on a cover of the second sensor 20 which is visible to the first sensor 10 (the first sensor 10 can be an infrared camera and the circle can be adapted to reflect infrared radiation). In another example the complete cover or housing of the first sensor can be provided with a reflective coating so as to enhance the accuracy and efficiency of the described localizing algorithm. The reflective coating can be adapted so as to reflect only infrared light so that the reflected radiation will be invisible for human eyes.

In a further aspect mounting tolerances of the first sensor 10 can be taken into consideration when localizing the second sensor 20. For example, the mounting position can vary due to manufacturing and temperature. In order to avoid an error due to such mounting tolerances the first sensor 10 can localize itself by means of the method described herein. For example, instead of a steering wheel 14 or other moveable element a static element in the field of view 12 of the first sensor 10 can be localized, wherein the static element has a fixed default spatial relationship with the first sensor 10. The static element can be for example a part of the plastics of the dashboard or center stack of the vehicle. In principle, parts of the window rims can be also be used. A deviation from the default position can then be determined and used to update the location of the first sensor 10. The location of the first sensor 10 can then be used to more reliably localize the second sensor 20 by means of the first sensor 10.

As an alternative to the particle-filter approach set forth above alternative methods include model fitting using least-squares techniques. Such methods typically require a good initialization, which can be a disadvantage in a comparison with the particle-filter approach, which is capable of localizing the steering wheel 14 without a strong prior.

A deep neural network can also be trained to localize the steering wheel 14 on the basis of the image. In one variant the 3D-coordinates of the steering wheel 14 are directly derived using the neural network. In another variant the network performs a semantic segmentation, e.g. all pixels in the image belonging to the steering wheel 14 (projection on the image plane) are identified. The information of these pixels can then be used to localize the steering wheel 14 using the particle-filter approach with an increased accuracy and/or efficiency.

A neural network approach requires sufficient training data, i.e. images of the steering wheel 14 in different positions and orientations. The advantage of the particle-filter approach is that it can be easily parametrized to work with different camera types, camera positions and steering wheel shapes, without requiring to collect training data.

It is understood that while the methods described herein are primarily described for the case of a single first sensor 10 more than one first sensor can be used to localize the second sensor 20 in the same manner, wherein a fusion of the different results can be adopted, thus enhancing availability and/or accuracy of the desired information.

The invention claimed is:

1. A method for localizing a sensor in a vehicle, the method comprising:
capturing at least one image of a moveable element of the vehicle by a first sensor that is mounted on the vehicle, the moveable element having a predetermined spatial relationship to a second sensor that is mounted on the vehicle, the moveable element being moveable relative to the first sensor;
determining spatial information on the moveable element on the basis of the at least one image; and
localizing the second sensor on the basis of the spatial information by a transformation rule representing the predetermined spatial relationship between the moveable element and the second sensor.

2. The method of claim 1, comprising matching a geometrical model of the moveable element to the at least one image by using a matching algorithm, wherein the spatial information is determined on the basis of the matched model.

3. The method of claim 2, wherein the matching algorithm comprises at least one of a particle algorithm, a grid-search algorithm and a regression algorithm.

4. The method of claim 2, wherein the matching comprises:
generating a plurality of sample points for the geometrical model, each of the sample points having a spatial position;
determining, for at least some of the sample points, a plurality of sample pixels of the at least one image, each of the pixels having a respective pixel value;
computing a rating function on the basis of the sample pixels; and determining the matched model on the basis of the rating function.

5. The method according to claim 4, wherein a first group of the sample points are located on the model, and a second group of the sample points are located outside the model, wherein difference pixel values are computed for sample points between the first group and the second group, and wherein the rating function is computed on the basis of the difference values.

6. The method according to claim 1, comprising processing at least a portion of the at least one image by a neural network for obtaining an output,
wherein the spatial information is determined on the basis of the output.

7. The method according to claim 1, wherein the at least one image comprises three-dimensional image data.

8. The method according to claim 1, wherein the spatial information comprises at least one of a position of the moveable element and an orientation of the moveable element.

9. The method according to claim 1, wherein the moveable element comprises at least a portion of one of the following:
a steering element of the vehicle,
a housing of the second sensor,
a steering element column of the vehicle, or
a headrest of a vehicle seat.

10. The method according to claim 1, wherein the first sensor is mounted on one of the following portions of the vehicle:
an inner side of a roof,
a pillar of a vehicle body,
a headrest of a seat, or
a seat backrest.

11. The method according to claim 1, wherein the second sensor is mounted on a steering wheel column of the vehicle, the steering wheel column being moveable relative to the first sensor and comprising the moveable element,
wherein the second sensor is configured to take images of a vehicle seat in which at least a portion of a passenger's body is expected to be located when the passenger is sitting on the vehicle seat.

12. The method according to claim 1, wherein the moveable element comprises a reflective surface having reflective properties being adapted to the first sensor.

13. The method according to claim 12, wherein the reflective properties are limited to a range of wavelengths invisible to human eyes.

14. A non-transitory computer readable medium comprising instructions, which when executed by a processing unit, cause the processing unit to carry out the method of claim 1.

15. A device for localizing a sensor in a vehicle, the device comprising:
an input for receiving at least one image captured by a first sensor mounted on the vehicle, and
a processing unit configured to determine a location of a second sensor mounted on the vehicle by:
capturing at least one image of a moveable element of the vehicle by the first sensor,
the moveable element having a predetermined spatial relationship to the second sensor, the moveable element being moveable relative to the first sensor;
determining spatial information on the moveable element on the basis of the at least one image; and
localizing the second sensor on the basis of the spatial information by a transformation rule representing the predetermined spatial relationship between the moveable element and the second sensor, wherein the processing unit is further configured to process images captured by the second sensor with respect to the location of the second sensor or to output the location.

16. A system comprising the device of claim 15, a first sensor and a second sensor, wherein at least the first sensor is connected to the device.

* * * * *